May 6, 1930.  H. S. HELE-SHAW ET AL  1,757,483
MEANS FOR THE HYDRAULIC TRANSMISSION OF POWER
Original Filed Oct. 4, 1924  3 Sheets-Sheet 1
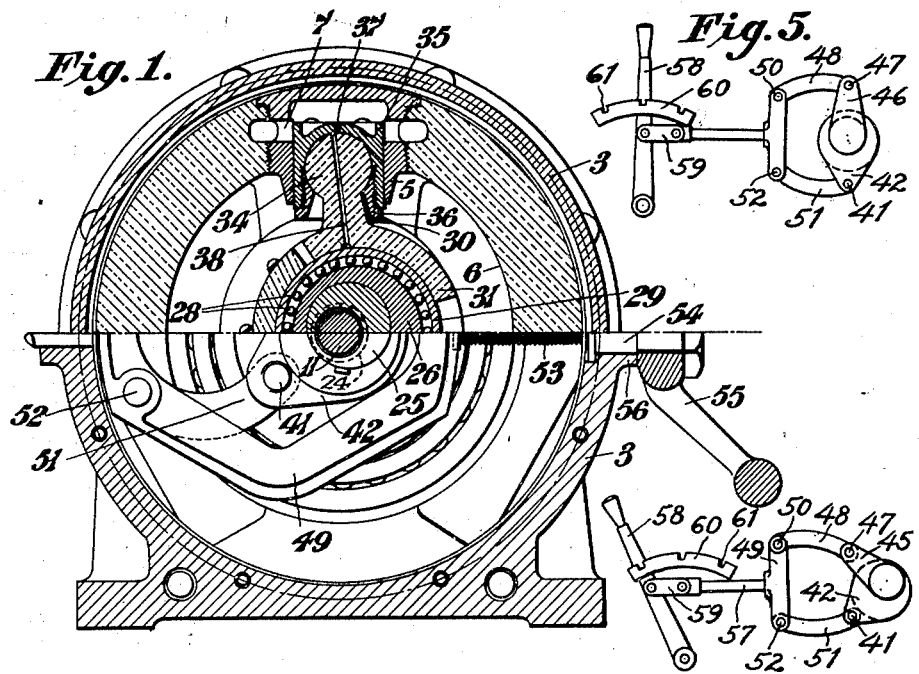
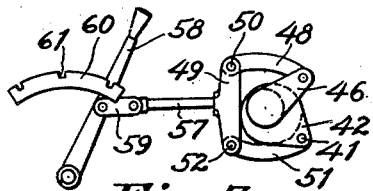

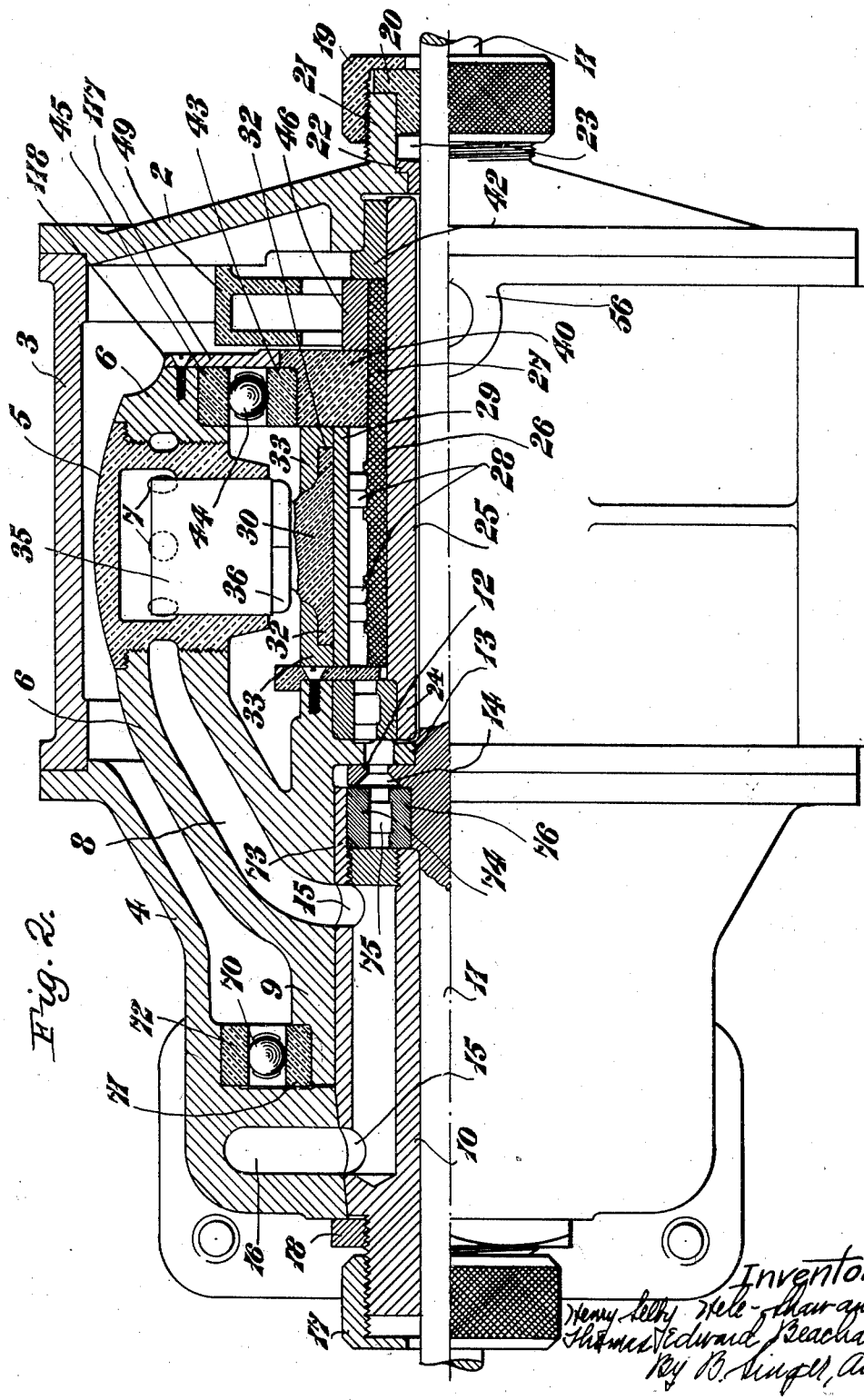

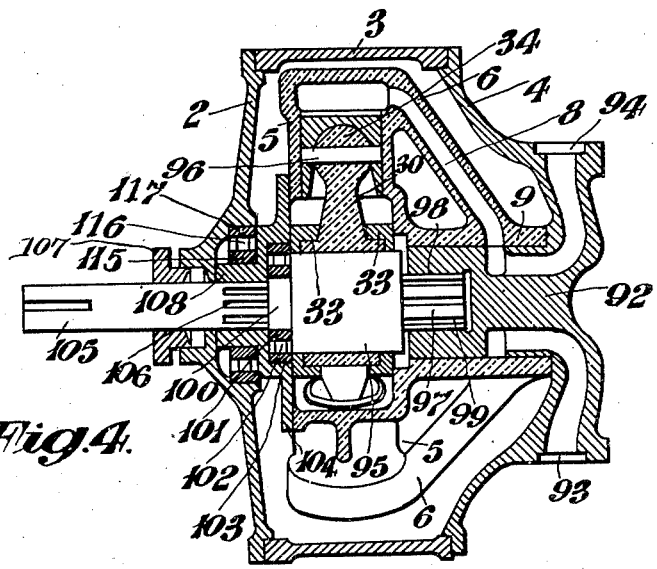
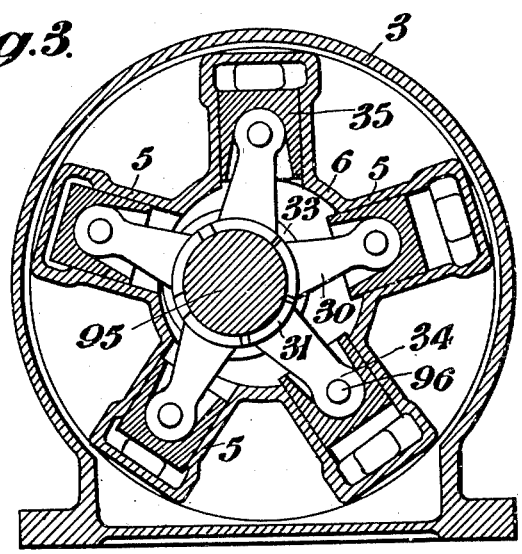

Patented May 6, 1930

1,757,483

UNITED STATES PATENT OFFICE

HENRY SELBY HELE-SHAW AND THOMAS EDWARD BEACHAM, OF LONDON, ENGLAND

MEANS FOR THE HYDRAULIC TRANSMISSION OF POWER

Application filed October 4, 1924, Serial No. 741,577, and in Great Britain October 12, 1923. Renewed September 19, 1928.

Our invention is for improvements in hydraulic transmission, and consists of a new form of pump and motor employed either separately or in combination with each other.

The pump and motor employed, which are similar in principle to each other, may be exactly alike and of the type operating upon an eccentric shaft which does not revolve.

The present invention comprises a hydraulic pump or motor having a number of radial cylinders provided with a central fixed valve and having pistons operating on a fixed eccentric shaft, wherein the shaft supports one or more of the bearings on which the cylinder body or carrier rotates. The shaft may be of variable eccentricity and is comprised of inner and outer sheaves.

The bearings of the cylinder carrier are preferably arranged at opposite sides of the cylinders, the bearing at one side of the cylinder carrier being supported by the rim of an eccentric of equal throw to the inner eccentric sheave and adjustable simultaneously therewith, while the bearing at the other side of the cylinder carrier is supported by a concentric extension on the inner end of the inner eccentric sheave. The inner eccentric sheave and the outer eccentric sheave may be moved around their axes relatively to each other to vary the stroke of the pistons, by means of oppositely disposed arms or cranklike members provided on them and connected by links to oppositely disposed arms on a slidable rod or frame provided with lever and other mechanism for moving it axially and holding it in the adjusted position.

The pump or motor is of the kind in which the supporting member at one end of the cylinder carrier is in the form of a hub or sleeve forming the rotary member of a fixed central valve controlling the supply of fluid to and from the cylinders during their rotation by their carrier.

The variable stroke mechanism comprises the eccentric shaft made by an outer eccentric sheave surrounding an inner eccentric sheave, and the outer sheave is provided with mechanism whereby its angular position on the inner eccentric sheave can be varied to vary the stroke of the pistons in the cylinders, the outer ends of the connecting rods bearing on the periphery of the outer eccentric sheave.

The eccentricity of the outer eccentric sheave may be equal to that of the inner eccentric sheave, so that they can be rotated relatively to each other to a position in which the strokes of the pistons will be zero, and so that when moved from zero position to the other extreme position, the strokes of the pistons will be of maximum value.

The inner eccentric sheave and the outer eccentric sheave may be moved round their axes relatively to each other, to vary the stroke of the piston, by means of oppositely disposed arms or crank-like members provided on them and connected by links to oppositely disposed arms on a slidable frame provided with lever and other mechanism for moving it axially and holding it in the adjusted position.

A further feature of the invention comprises a hydraulic pump or motor having a number of pistons operating on a fixed eccentric shaft from cylinders mounted radially in a rotatable carrier having a supporting member consisting of a hub or bearing sleeve rotating on or within a central fixed valve and provided with fluid passages extending to the cylinders, wherein the hub or sleeve of the carrier is mounted directly on or within the valve by roller or ball bearings. Also the invention further comprises a hydraulic pump or motor having a number of pistons operating on a crank or swash plate from cylinders mounted on a fixed or rotary carrier and provided with fluid passages extending to the cylinder, wherein the carrier is mounted on or within the valve by roller or ball bearings the outside races of which are larger in diameter than the valve, and the valve and the carrier are made of metals of approximately equal thermal coefficient of expansion, so that any variation in the temperature of the parts during working will not produce a binding of the friction surfaces due to unequal expansion of the adjacent parts.

Various embodiments of the invention are illustrated by the accompanying drawings wherein Figure 1 is a transverse view partly in section and Figure 2 a longitudinal view partly in section through the casing of a pump made in accordance with the present invention.

Figures 3 and 4 are similar views illustrating diagrammatically a motor made on the same general principle as the pump.

Figures 5, 6 and 7 illustrate different positions of a link motion for varying the stroke of the pistons.

In Figures 1 to 4 the casing is made of three parts 2, 3 and 4 connected together in any suitable manner such as by screws or bolts. The cylinders 5 of which there is preferably an odd number—five being used in the present example—are screwed radially into a cup-shaped rotary carrier 6 at equal angles apart. The cylinders are single acting and provided near the closed ends with ports 7 which communicate by radial passages 8 with port openings in the bearing faces in a supporting member comprising a hub or sleeve 9 of the carrier 6.

The sleeve 9 rotates on a shaft 10 bored to form a bearing for a driving shaft 11 passing through the casing and provided with a flange 12 whereby it is fixed to a flange 13 on the carrier 6 by screw or other suitable devices 14.

The hollow shaft 10 forms the fixed valve and is provided with ports 15 which place the passages 8 in communication with the passages 16 as the carrier 6 is rotated. Two sets of passages 16 are provided, one communicating with the delivery outlet and the other with the inlet of the pump in the usual manner.

The hollow shaft 10 is secured in the casing 4 by means of a nut 17 and washer 18. At the other end of the casing is a similar nut 19 by which a flanged bearing bush 20 for the driving shaft 11 is secured in a gland 21 in the removable end 2 of the casing. At the inner end of the gland 21 is provided a bush 22 between which and the inner end of the bush 20 is a packing space 23.

Around the shaft 11 is arranged an inner eccentric sheave 25 having at one end an extension 24 made integral therewith but concentric with respect to the shaft 11. An outer eccentric sheave 26 is mounted on the inner sheave 25. The sheave 26 has a portion 27 at one end thereof made concentric with respect to inner eccentric sheave 25. The inner eccentric sheave 25, not including its extension 24, and the outer eccentric sheave 26, including its portion 27, form a fixed eccentric shaft whose eccentricity at the right hand end as viewed in Fig. 2 differs from its eccentricity at the left end due to the portion 27 of the outer eccentric sheave 26 being concentric to inner eccentric sheave 25.

The connecting rods 30 operatively engage the fixed eccentric shaft comprising the inner and outer eccentric sheaves 25 and 26 respectively by having their curved faced extensions 31 bear against the outside of a sleeve 29 mounted on rollers 28 running on the periphery of outer eccentric sheave 26. As the eccentricity of the fixed eccentric shaft can be varied by turning the inner eccentric sheave 25 and outer eccentric sheave 26 with respect to each other, the stroke of the pistons can be adjusted.

The connecting rods 30 have spherical inner ends 34 fitting in a spherical socket in the truncated pistons 35 and held therein by a split gland 36 screwing into the inner end of the piston 35.

Lubricating holes 37 and 38 are provided in the piston 35 and in the connecting rod 30, for the purpose of admitting lubricant to the spherical bearing at one end of the connecting rod 30 and the cylindrical bearing at its other end on the eccentric sleeve 29.

On the parallel or concentric portion 27 of the eccentric sheave 26 is mounted an eccentric sheave 40, the eccentricity of which is equal to the eccentricity of the inner eccentric sheave 25 and this sheave 40 is connected by a pin 41 to an arm or member 42 secured to the sheave 25 so that when the eccentric sheave 25 is turned angularly about the axis of its shaft 24 by the arm 42, the eccentric sheave 40 will be also moved angularly in such a manner as to maintain its periphery concentric with the shaft 11. This enables the inner ball race member 43 of a ball bearing 44 to be mounted on the periphery of the eccentric 40, the outer ball race 45 being secured in the cylinder carrier 6. The eccentric sheave 40 provides means for supporting one of the bearings of the rotor 6 on the fixed eccentric shaft comprising inner eccentric sheave 25 and outer eccentric sheave 26 which form the means for adjusting the stroke of the piston.

The means for varying the eccentricity of the fixed eccentric shaft by turning eccentric sheaves 25 and 26 with respect to each other can be located on the opposite side of the bearing supported by the eccentric sheave 40 from the cylinders because the portion 27 of outer eccentric sheave 26 is concentric with respect to both eccentric sheave 40 and inner eccentric sheave 25 and therefore is free to turn between them. It is for this reason that the portion 27 of eccentric sheave 26 is made concentric with inner eccentric sheave 25.

The outer eccentric sheave 26 is turned angularly about its concentric portion 27 by means of an arm or member 46 connected by a pin 47 and link 48 (see Figures 5, 6 and 7) to a cross head 49, the other end of the link 48 being connected to the cross head 49 by a pin 50. In a similar manner the arm 42 is connected to one end of a link 51 by a pin 41, the other end of the link 51 being connected to the cross head 49 by a pin 52.

The cross head 49 is moved at right angles to the shaft 11 by means of a screw 53 and nut 54 (see Figure 1).

The nut 54 is rotatively mounted in a boss 56 formed on the central portion 3 of the casing, and is provided with an operating handle 55. In Figures 5, 6 and 7 the cross head is mounted on a shaft 57 movable longitudinally in a bearing which may be arranged in the boss 56. In this example the cross head shaft 57 is moved longitudinally by a pivoted hand lever 58 to which it is connected by a link 59. The hand lever 58 works over a quadrant 60 provided with a suitable number of notches 61 whereby it can be held by any suitable catch mechanism in the usual manner in any adjusted angular position.

This mechanism is arranged to pull the arms 42 and 46 of the inner and outer eccentric sheaves 25 and 26 in opposite directions so as to vary the eccentricity of the fixed eccentric shaft and consequently the strokes of the pistons.

The sleeve 9 of the carrier in the example illustrated in Figure 2 is provided at its end with a ball bearing 70 of which the inner race 71 is fixed on the end of the sleeve 9 while the outer race 72 is fixed in the casing 4. Also at the end of the shaft 10 is provided an annular projection 73 in which is fixed the outer race 74 of a roller bearing 75, the inner race 76 of the bearing being fixed on the shaft 11. The outer end of the carrier 6 is provided with an oil retaining plate 117 held thereon by screws 118.

A motor may be constructed on the same principle as the pump as shown in Figs. 1 and 2, or it may be of any other suitable type, such for instance as shown in Figs. 3 and 4.

In Figs. 3 and 4 the motor as in Figure 1, has a casing consisting of three parts 2, 3 and 4, and radial cylinders 5 carried by or formed on a carrier 6 provided with passages 8 leading to a sleeve 9 rotating on a cylindrical valve 92 integral with the casing 4 and provided with inlet and outlet passages 93 and 94. The connecting rods 30 are as in Figure 1 spherical at the end 34 bearing in the pistons and at the other end provided with cylindrical surfaces bearing on a fixed crank pin 95 against which they are held by rings 33. In this example the spherical ends 34 of the connecting rods are held in the spherical sockets in the pistons by gudgeon pins 96.

The shaft 97 of the crank 95 is provided at one end with fixing keys or projections 99 fitting in grooves in an opening 98 in the cylindrical or valve portion 92 of the casing. The other end 100 of the crank shaft has fitted thereon the inner race 101 of a roller bearing 102, the outer race 103 of the bearing being fixed in a driver 104 secured to the cylinder carrier 6. The driver 104 is bored to receive the power shaft 105 of the motor and is keyed thereto by keys 106. The shaft 105 is mounted in a gland bearing 107 secured to the end 2 of the motor casing, and on the outer surface of a cylindrical portion 108 of the driver 104 is fixed the inner race 115 of a roller bearing 116, the outer race 117 of the bearing being fixed in a recess in the end 2 of the casing.

In this example the fluid from the pump passing through the passages 8 re-acts on the pistons and so rotates the carrier 6 to which the driver 104 keyed to the shaft 105 is fixed, and so rotates the power shaft 105.

The construction of the valve may be modified so that for instance the ports of the cylinders may extend into an extension of the boss or hub of the cylinder carrier provided with ports rotating in a bearing in the casing provided with the inlet and outlet fluid passage.

The hub or sleeve 9 of the cylinder carrier may be mounted directly on the central valve in ball or roller bearings, that is the bearings 70 and 75 as shown in Figure 2 may be so modified that the ball or roller race 74 is fixed directly in the sleeve 9 and the ball or roller race 76 directly on the central valve which is shown in this figure as a hollow shaft 10, and the ball or roller race 72 is fixed directly in the sleeve 9 of the carrier 6, while the race 71 is fixed on the central valve similarly to the race 72.

What we claim and desire to secure by Letters Patent is:—

1. A pump or motor comprising in combination a rotor including diverging cylinders, pistons therein, supporting means for the rotor, a valve adjacent one side of the rotor having a substantially smaller diameter than the rotor and located within said rotor, fluid passages in the rotor between the valve and the cylinder outer ends, bearings for the rotor arranged one on each side of said cylinders, and means passing through one of said bearings for adjusting the stroke of said pistons.

2. A pump or motor comprising in combination a rotor provided with fluid passages, bearings on which the rotor is mounted, diverging cylinders mounted in the rotor, pistons therein, a fixed eccentric shaft, connecting rods carried by the pistons and operatively engaging the eccentric shaft, a fixed central valve on which the rotor rotates provided with inlet and outlet passages cooperating with the passages in the rotor for controlling the supply of fluid to and from the cylinders, and means passing through one of the bearings for adjusting the stroke of the pistons.

3. A pump or motor comprising in combination a rotor provided with fluid passages, bearings on which the rotor is mounted, diverging cylinders closed at their outer ends screwed into the rotor, pistons therein, a fixed central valve on which the rotor rotates provided with inlet and outlet passages cooperating with the passages in the rotor for controlling the supply of fluid to and from the cylinder outer ends, and means passing through one of the bearings for adjusting the stroke of the pistons.

4. A pump or motor comprising in combination a rotor provided with fluid passages, bearings on which the rotor is mounted, diverging cylinders mounted in the rotor, pistons therein, a fixed eccentric shaft, connecting rods carried by the pistons and operatively engaging the eccentric shaft, a fixed central valve on which one end of the rotor rotates cooperating with the passages in the rotor for controlling the supply of fluid to and from the cylinders, and means passing through one of the bearings at the opposite end of the rotor from said valve for adjusting the stroke of the pistons.

5. A pump or motor comprising in combination a rotor provided with fluid passages, bearings on which the rotor is mounted, diverging cylinders mounted in the rotor, pistons therein, a fixed eccentric shaft, connecting rods carried by the pistons and operatively engaging the eccentric shaft, a fixed valve provided with inlet and outlet passages cooperating with the passages in the rotor for controlling the supply of fluid to and from the cylinders, means for supporting one of the bearings on said eccentric shaft at one side of the cylinders, and means for varying the eccentricity of said shaft on the opposite side of said bearing from the cylinders.

6. A pump or motor comprising in combination a rotor provided with fluid passages, bearings on which the rotor is mounted, diverging cylinders screwed into the rotor, pistons therein, a fixed eccentric shaft, connecting rods carried by the pistons and operatively engaging the eccentric shaft, a fixed valve provided with inlet and outlet passages cooperating with the passages in the rotor for controlling the supply of fluid to and from the cylinders, means for supporting one of the bearings on said eccentric shaft at one side of the cylinders, and means for varying the eccentricity of said shaft on the opposite side of said bearing from the cylinders.

7. A pump or motor comprising in combination a rotor provided with fluid passages, bearings on which the rotor is mounted, diverging cylinders mounted in the rotor, pistons therein, a fixed eccentric shaft comprising inner and outer eccentric sheaves arranged one within the other, connecting rods carried by the pistons and operatively engaging the eccentric shaft, a fixed valve provided with inlet and outlet passages cooperating with the passages in the rotor for controlling the supply of fluid to and from the cylinders, means for supporting one of the bearings on said eccentric shaft, and means for rotating the eccentric sheaves with respect to each other to adjust the stroke of the pistons.

8. A pump or motor comprising in combination a rotor provided with fluid passages, bearings on which the rotor is mounted, diverging cylinders mounted in the rotor, pistons therein, a fixed eccentric shaft comprising inner and outer eccentric sheaves arranged one within the other, connecting rods carried by the pistons and operatively engaging the eccentric shaft, a fixed central valve on which the rotor rotates provided with inlet and outlet passages cooperating with the passages in the rotor for controlling the supply of fluid to and from the cylinders, means for supporting one of the bearings on said eccentric shaft, and means for rotating the eccentric sheaves with respect to each other to adjust the stroke of the pistons.

9. A pump or motor comprising in combination a rotor provided with fluid passages, bearings on which the rotor is mounted, diverging cylinders closed at their outer ends screwed into the rotor, pistons therein, a fixed eccentric shaft comprising inner and outer eccentric sheaves arranged one within the other, connecting rods carried by the pistons and operatively engaging the eccentric shaft, a fixed central valve on which the rotor rotates provided with inlet and outlet passages cooperating with the passages in the rotor for controlling the supply of fluid to and from the cylinder outer ends, means for supporting one of the bearings on said eccentric shaft, and means for rotating the eccentric sheaves with respect to each other to adjust the stroke of the pistons.

In witness whereof we affix our signatures.

HENRY SELBY HELE-SHAW.
THOMAS EDWARD BEACHAM.